United States Patent Office 3,097,228
Patented July 9, 1963

3,097,228
DERIVATIVES OF 2,4,6 - TRIIODOBENZOYL-
OXYALKANOIC ACIDS AND PREPARATION
THEREOF
Aubrey A. Larsen, Schodack, N.Y., assignor to Sterling
Drug Inc., New York, N.Y., a corporation of Delaware
No Drawing. Filed June 3, 1958, Ser. No. 739,466
22 Claims. (Cl. 260—471)

This invention relates to polyiodinated zenzoic acid derivatives, and is particularly concerned with derivatives of 2,4,6-triiodobenzoyloxyalkanoic acids having the formula

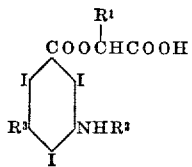

(A)

and to salts and lower-alkyl esters thereof. The invention also relates to methods for the preparation of said acids and esters.

In the above general Formula A, $R^1$ represents hydrogen or a lower-alkyl radical. The lower-alkyl radical preferably has from one to about four carbon atoms and thus includes such groups as methyl, ethyl, propyl, isopropyl, butyl, isobutyl, and the like.

In the above general Formula A, $R^2$ represents hydrogen or a lower-alkanoyl radical. The lower-alkanoyl radical preferably has from one to about six carbon atoms and thus includes such groups as formyl, acetyl, propionyl, butyryl, isobutyryl, valeryl, caproyl, and the like.

In the above general Formula A, $R^3$ represents hydrogen or a lower-alkanoylamino radical. The lower-alkanoylamino radical. The lower-alkanoylamino radical preferably has from one to about six carbon atoms and thus includes such groups as formylamino, acetylamino, propionylamino, butyrylamino, isobutyrylamino, valerylamino, caproylamino, and the like.

The compounds of the invention are prepared from known acids of the formula

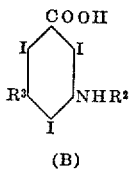

(B)

wherein $R^2$ and $R^3$ have the meanings given hereinabove. A metal salt of an acid of Formula B is caused to react with a lower-alkyl α-haloalkanoate of the formula $XCH(R^1)COOR^4$, wherein X is halogen, preferably chlorine, bromine or iodine, $R^1$ has the meaning given hereinabove, and $R^4$ represents a lower-alkyl radical. There is produced a benzoyloxy ester of the formula

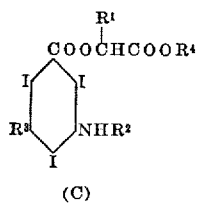

(C)

In the above general Formula C, $R^1$, $R^2$ and $R^3$ have the meanings given hereinabove, and $R^4$ represents a lower-alkyl radical, preferably having from one to about six carbon atoms, thus including such groups as methyl, ethyl, propyl, isopropyl, butyl, isobutyl, pentyl, hexyl, and the like.

The reaction between a metal or ammonium salt of an acid of Formula B and a lower-alkyl α-haloalkanoate is a double decomposition reaction in which a metal or ammonium halide is produced as a by-product along with the ester of Formula C. Any metal salt can be used in the reaction, although alkali metal salts, in particular the sodium salt, are preferred. A preferred method of carrying out the reaction comprises heating approximately equimolar quantities of the salt of acid B and the lower-alkyl α-haloalkanoate at a temperature between about 50° C. and 150° C. in an inert solvent. Suitable inert solvents are organic solvents having a considerabel degree of polar character, such as the lower-alkanols, dioxane or dimethylformamide. The salt of the acid B can either be used directly or prepared in situ from the free acid by adding to the reaction mixture an equivalent amount of a base in the form of a metal or ammonium hydroxide, carbonate or bicarbonate.

The acids of Formula A are produced by a selective hydrolysis of the esters of Formula C. There are several parts of the structure C which are susceptible to hydrolysis, namely, the terminal carboalkoxy group, the benzoate linkage, and the N-acyl groups which may be present in $R^2$ and $R^3$. According to the present invention, a method has been found for selectively hydrolyzing the terminal carboalkoxy group without affecting the other hydrolyzable radicals. The selective hydrolysis is carried out by heating the esters in the presence of an alkali metal hydroxide in aqueous-lower-alkanol solution. An equimolar quantity of hydroxide or a slight excess is employed and it is preferred to add it in portions to the hydrolysis mixture in order to avoid a large excess at any one time so that there will be little tendency to bring about hydrolysis of the benzoate linkage or of any N-acyl groups which may be present. The concentration of alkali in the hydrolysis reaction is of the order of magnitude of 0.1 to 0.5 normal. The lower-alkanol, preferably methanol or ethanol, is present to an extent necessary to bring about solution of at least a portion of the ester C; this occurs when the amounts of water and alkanol are about equal in volume. The hydrolysis is carried out by heating the mixture at a temperature between about 50° C. and 100° C.

Alternatively, acids of Formula A where $R^2$ represents a lower-alkanoyl radical can be prepared by acylation of the corresponding acid where $R^2$ is hydrogen by heating the latter with the appropriate acid halide or acid anhydride in the presence of pyridine.

Also within the scope of the invention are salts of the acids of Formula A. Preferred types of salts are those having cations which do not increase the toxicity of the compound as a whole toward animal organisms. These comprise the alkali metal salts, such as the sodium or potassium salts; the lower-alkaline earth metal salts, such as the magnesium or calcium salts; and the ammonium or organic amine salts, such as the diethanolamine or N-methylglucamine salts. Other salts, however, including those having toxic cations, are useful in characterizing the free acids, and as intermediates in purification of the free acids.

The acids of Formula A are useful as X-ray contrast agents and are particularly valuable for visualizing the gallbladder (cholecystography). Upon either oral or intravenous administration at non-toxic dose levels (100 mg./kg.) these compounds readily concentrate in the gallbladder so that it is readily visualized in X-ray photographs. The compounds A are administered orally either in the free acid form or in the form of a non-toxic salt. They are administered intravenously in the form of a water-soluble, non-toxic salt.

3

The esters of Formula C are useful as X-ray contrast agents and are particularly valuable for visualizing the bronchial tree (bronchography), and for hepatolienography (visualization of the liver and spleen). For bronchography these compounds can be introduced into the lungs either as a finely divided dust or in an aqueous suspension prepared by the aid of emulsifying agents such as carboxymethylcellulose, polyvinylpyrrolidone, dextran and the like, for the purpose of delineating the morphology of the bronchial tree.

For hepatolienography the compounds of Formula C are administered intravenously in the form of an aqueous suspension of very finely divided particles. The compounds concentrate in the liver and spleen and are completely eliminated from the animal organism in a few days' to a few weeks' time. This is a distinct advantage over the known alkyl esters of the acids of Formula B which are eliminated from the animal organism only after periods of approximately a year.

The structure of the compounds of the invention was established by the mode of synthesis and confirmed by chemical analysis.

The following examples will further illustrate the invention without the latter being limited thereby.

Example 1

Ethyl (3,5-diacetamido-2,4,6-triiodobenzoyloxy)acetate [C; $R^1$ is H, $R^2$ is $COCH^3$, $R^3$ is $CH_3CONHR$, $R^4$ is $C_2H_5$].—A mixture of 63.6 g. (0.10 mole) of sodium 3,5-diacetamido-2,4,6-triiodobenzoate and 14.7 g. (0.12 mole) of ethyl chloroacetate in 175 ml. of dimethylformamide was heated on a steam bath with stirring for six hours. The reaction mixture was filtered while hot and the filtrate was diluted with cold water to a volume of 500 ml. The solid material which had separated was collected by filtration and stirred with 500 ml. of 5% sodium bicarbonate solution. The product was again collected by filtration, washed with water and with ether and dissolved in 300 ml. of hot dimethylformamide. The latter solution was filtered, 350 ml. of hot water was added, and after cooling the product was collected by filtration and dried, giving 53 g. of ethyl (3,5-diacetamido - 2,4,6 - triiodobenzoyloxy)acetate, M.P. 269.5–270.5° C. (dec.)(corr.).

Anal.—Calcd. for $C_{15}H_{15}I_3N_2O_6$: C, 25.73; H, 2.15; I, 54.4. Found: C, 25.80; H, 2.77; I, 53.8.

Ethyl (3,5-diacetamido-2,4,6-triiodobenzoyloxy)acetate was found to have an intraperitoneal toxicity ($ALD_{50}$, approximate lethal dose) of greater than 8000 mg./kg., of body weight in the mouse. It was found to be completely absorbed from the peritoneal cavity within seven days, thus indicating its usefulness as a hepatolienographic agent.

Example 2

Ethyl (3,5-diformylamino-2,4,6-triiodobenzoyloxy)acetate [C; $R^1$ is H, $R^2$ is COH, $R^3$ is HCONH, $R^4$ is $C_2H_5$] can be prepared by replacement of the sodium 3,5-diacetamido-2,4,6-triiodobenzoate in Example 1 by a molar equivalent amount of sodium 3,5-diformylamino-2,4,6-triiodobenzoate.

Example 3

Ethyl (3,5-dipropionylamino-2,4,6-triiodobenzoyloxy)-acetate [C; $R^1$ is H, $R^2$ is $COCH_2CH_3$, $R^3$ is $$CH_3CH_2CONH$$

$R^4$ is $C_2H_5$] can be prepared by replacement of the sodium 3,5-diacetamido-2,4,6-triiodobenzoate in Example 1 by a molar equivalent amount of sodium 3,5-dipropionylamino-2,4,6-triiodobenzoate.

Example 4

Ethyl (3-acetaylamino-5-propionylamino-2,4,6-triiodobenzoyloxy)acetate [C; $R^1$ is H, $R^2$ is $COCH_3$, $R^3$ is $CH_3CH_2CONH$, $R^4$ is $C_2H_5$] can be prepared by replacement of sodium 3,5-diacetamido-2,4,6-triiodobenzoate in Example 1 by a molar equivalent amount of sodium 3-acetylamino-5-propionylamino-2,4,6-triiodobenzoate.

Example 5

Ethyl (3,5-dibutyrylamino-2,4,6-triiodobenzoyloxy)acetate [C; $R^1$ is H, $R^2$ is $CO(CH_2)_2CH_3$, $R^3$ is $$CH_3(CH_2)_2CONH$$

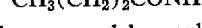

$R^4$ is $C_2H_5$] can be prepared by replacement of the sodium 3,5-diacetamido-2,4,6-triiodobenzoate in Example 1 by a molar equivalent amount of sodium 3,5-dibutyrylamino-2,4,6-triiodobenzoate.

Example 6

Ethyl (3 -acetylamino - 5 -caproylamino - 2,4,6 - triiodobenzoyloxy)-acetate [C; $R^1$ is H, $R^2$ is $COCH_3$, $R^3$ is $CH_3(CH_2)_4CONH$, $R^4$ is $C_2H_5$] can be prepared by replacement of the sodium 3,5-diacetamido-2,4,6-triiodobenzoate in Example 1 by a molar equivalent amount of sodium 3-acetylamino-5-caproylamino-2,4,6-triiodobenzoate.

Example 7

Ethyl (3 - propionylamino - 2,4,6-triiodobenzoyloxy)-acetate [C; $R^1$ is H, $R^2$ is $COCH_2CH_3$, $R^3$ is H, $R^4$ is $C_2H_5$] can be prepared by replacement of the sodium 3,5-diacetamido-2,4,6-triiodobenzoate in Example 1 by a molar equivalent amount of sodium 3-propionylamino-2,4,6-triiodobenzoate.

Example 8

Ethyl (3 - butyrylamino - 2,4,6 - triiodobenzoyloxy)-acetate [C; $R^1$ is H, $R^2$ is $CO(CH_2)_2CH_3$, $R^3$ is H, $R^4$ is $C_2H_5$] can be prepared by replacement of the sodium 3,5-diacetamido-2,4,6-triiodobenzoate in Example 1 by a molar equivalent amount of sodium 3-butyrylamino-2,4,6-triiodobenzoate.

Example 9

Methyl (3,5 - diacetamido - 2,4,6 - triiodobenzoyloxy)-acetate [C; $R^1$ is H, $R^2$ is $COCH_3$, $R^3$ is $CH_3CONH$, $R^4$ is $CH_3$] can be prepared by replacement of the ethyl chloroacetate in Example 1 by a molar equivalent amount of methyl chloroacetate.

Example 10 n-Propyl (3,5 - diacetamido - 2,4,6 - triiodobenzoyloxy)acetate [C; $R^1$ is H, $R^2$ is $COCH_3$, $R^3$ is $CH_3CONH$, $R^4$ is $(CH_2)_2CH_3$] can be prepared by replacement of ethyl chloroacetate in Example 1 by a molar equivalent amount of propyl chloroacetate.

Example 11

Isopropyl (3,5 - diacetamido - 2,4,6 - triiodobenzoyloxy)acetate [C; $R^1$ is H, $R^2$ is $COCH_3$, $R^3$ is $CH_3CONH$, $R^4$ is $CH(CH_3)_2$] can be prepared by replacement of the ethyl chloroacetate in Example 1 by a molar equivalent amount of isopropyl chloroacetate.

Example 12 n-Butyl (3,5 - diacetamido - 2,4,6 - triiodobenzoyloxy)-acetate [C; $R^1$ is H, $R^2$ is $COCH_3$, $R^3$ is $CH_3CONH$, $R^4$ is $(CH_2)_3CH_3$] can be prepared by replacement of the ethyl chloroacetate in Example 1 by a molar equivalent amount of n-butyl chloroacetate.

Example 13 n-Hexyl (3,5 - diacetamido - 2,4,6 - triiodobenzoyloxy)acetate [C; $R^1$ is H, $R^2$ is $COCH_3$, $R^3$ is $CH_3CONH$, $R^4$ is $(CH_2)_5CH_3$] can be prepared by replacement of the ethyl chloroacetate in Example 1 by a molar equivalent amount of n-hexyl chloroacetate.

Example 14

Ethyl 2 - (3,5 - diacetamido - 2,4,6 - triiodobenzoyloxy)pentanoate [C; $R^1$ is $CH_3(CH_2)_2$, $R^2$ is $COCH_3$, $R^3$

is CH₃CONH, R⁴ is C₂H₅] can be prepared by replacement of the ethyl chloroacetate in Example 1 by a molar equivalent amount of ethyl α-bromo-α-(n-propyl)acetate.

Example 15

Ethyl 2 - (3,5 - diacetamido - 2,4,6 - triiodobenzoyloxy)hexanoate [C; R¹ is CH₃(CH₂)₃, R² is COCH₃, R³ is CH₃CONH, R⁴ is C₂H₅] can be prepared by replacement of the ethyl chloroacetate in Example 1 by a molar equivalent amount of ethyl α-bromo-α-(n-butyl)acetate.

Example 16

Ethyl 2 - (3,5 - diacetamido - 2,4,6 - triiodobenzoyloxy)-3-methylbutanoate [C; R¹ is (CH₃)₂CH, R² is COCH₃, R³ is CH₃CONH, R⁴ is C₂H₅] can be prepared by replacement of the ethyl chloroacetate in Example 1 by a molar equivalent amount of ethyl α-bromo-α-isopropylacetate.

Example 17

Ethyl 2 - (3,5 - diacetamido - 2,4,6 - triiodobenzoyloxy)butanoate [C; R¹ is C₂H₅, R² is COCH₃, R³ is CH₃CONH, R⁴ is C₂H₅].

A mixture of 159 g. (0.25 mole) of sodium 3,5-diacetamido-2,4,6-triiodobenzoate and 54.5 g. (0.28 mole) of ethyl α-bromobutyrate in 500 ml. of dimethylformamide was heated on a steam bath for twenty hours. The reaction mixture was poured into 3 liters of dilute ammonium hydroxide, and the product which separated was collected by filtration and washed with water. The latter was recrystallized from 3 liters of 50% ethanol in water, using activated charcoal for decolorizing purposes, and dried at 100° C. for about fifteen hours, giving 103 g. of ethyl 2-(3,5-diacetamido-2,4,6-triiodobenzoyloxy)-butanoate, M.P. 277.2–280.0° C. (dec.)(corr.).

Anal.—Calcd. for C₁₇H₁₉I₃N₂O₆: C, 28.05; H, 2.63; I, 52.3. Found: C, 28.36; H, 2.55; I, 52.3.

Example 18

Ethyl (3 - acetamido - 2,4,6 - triiodobenzoyloxy)acetate [C; R¹ is H, R² is COCH₃, R³ is H, R⁴ is C₂H₅] was prepared from 26.8 g. of sodium 3-acetamido-2,4,6-triiodobenzoate and 6.4 ml. of ethyl chloroacetate in 100 ml. of dimethylformamide according to the manipulative procedure described above in Example 17. The product was recrystallized from aqueous dimethylformamide and dried at 100° C. for five hours to give 15 g. of ethyl (3 - acetamido - 2,4,6 - triiodobenzoyloxy)acetate, M.P. 193.0–194.2° C. (corr.).

Anal.—Calcd. for C₁₃H₁₂I₃NO₅: C, 24.29; H, 1.88; I, 59.2. Found: C, 24.35; H, 2.41; I, 59.7.

Example 19

Ethyl 2 - (3 - acetamido - 2,4,6 - triiodobenzoyloxy)butanoate [C; R¹ is C₂H₅, R² is COCH₃, R³ is H, R⁴ is C₂H₅] was prepared from 26.8 g. of sodium 3-acetamido-2,4,6-triiodobenzoate and 11 g. of ethyl α-bromo-n-butyrate in 100 ml. of dimethylformamide according to the manipulative procedure described above in Example 17. The product was recrystallized from 300 ml. of isopropyl alcohol and dried at 100° C. for two days to give 23 g. of ethyl 2-(3-acetamido-2,4,6-triiodobenzoyloxy)butanoate, M.P. 159.0–161.6° C. (corr.).

Anal.—Calcd. for C₁₅H₁₆I₃NO₅: C, 26.84; H, 2.40; I, 56.74. Found: C, 26.55; H, 2.33; I, 56.32.

Example 20

Ethyl (3 - amino - 2,4,6 - triiodobenzoyloxy)acetate [C; R¹ is H, R² is H, R³ is H, R⁴ is C₂H₅] was prepared from 25.7 g. (0.05 mole) of 3-amino-2,4,6-triiodobenzoic acid, 6.4 ml. (0.06 mole) of ethyl chloroacetate and 2.65 g. (0.025 mole) of sodium carbonate in 100 ml. of dimethylformamide according to the manipulative procedure described above in Example 17. The product was recrystallized from 700 ml. of isopropyl alcohol and dried at 70° C. for eighteen hours to give 11.5 g. of ethyl (3- amino - 2,4,6 - triiodobenzoyloxy)acetate, M.P. 125.2–128.4° C. (corr.).

Anal.—Calcd. for C₁₁H₁₀I₃NO₄: C, 21.98; H, 1.68; I, 63.36. Found: C, 22.08; H, 1.63; I, 62.92.

Example 21

Ethyl 2 - (3,5 - diacetamido - 2,4,6 - triiodobenzoyloxy)propanoate [C; R¹ is CH₃, R² is COCH₃, R³ is CH₃CONH, R⁴ is C₂H₅] was prepared from 127.2 g. of sodium 3,5-diacetamido-2,4,6-triiodobenzoate and 40 g. of ethyl α-bromopropionate in 800 ml. of dimethylformamide according to the manipulative procedure described above in Example 17. The product was recrystallized from 1500 ml. of dilute dimethylformamide and dried at 100° C. for five days to give ethyl 2-(3,5-diacetamido-2,4,6-triiodobenzoyloxy)propanoate, M.P. 264° C. (dec.) (corr.).

Anal.—Calcd. for C₁₆H₁₇I₃N₂O₆: C, 26.91; H, 2.40; I, 53.32. Found: C, 27.21; H, 2.38; I, 52.83.

Example 22

Ethyl 2-(3-amino-2,4,6 - triiodobenzoyloxy)propanoate [C; R¹ is CH₃, R² is H, R³ is H, R⁴ is C₂H₅] was prepared from 51.5 g. of 3-amino-2,4,6-triiodobenzoic acid, 20 g. of ethyl α-bromopropionate and 5.3 g. of sodium carbonate in 200 ml. of dimethylformamide according to the manipulative procedure described above in Example 17. The product was recrystallized first from isopropyl alcohol and then from methanol and dried at 70° C. for about fifteen hours to give 36.5 g. of ethyl 2-(3-amino-2,4,6-triiodobenzoyloxy)propoanoate, M.P. 122.2–123.8° C. (corr.).

Anal.—Calcd. for C₁₂H₁₂I₃NO₄: C, 23,43; H, 1.97; I, 61.91. Found: C, 23.66; H, 2.13; I, 61.77.

Example 23

Ethyl 2-(3-amino - 2,4,6 - triiodobenzoyloxy)butanoate [C; R¹ is C₂H₅, R² is H, R³ is H, R⁴ is C₂H₅] was prepared from 51.5 g. of 3-amino-2,4,6-triiodobenzoic acid, 20 g. of ethyl α-bromo-n-butyrate and 5.3 g. of sodium carbonate in 200 ml. of dimethylformamide according to the manipulative procedure described above in Example 17. The product was recrystallized from isopropyl alcohol to give 48 g. of ethyl 2-(3-amino-2,4,6-triiodobenzoyloxy)butanoate, M.P. 72–75° C. (uncorr.). The latter material was recrystallized first from methanol and then from isopropyl alcohol and dried for twenty-four hours at 65° C. and for ninety-six hours at 50° C. in vacuo to give a sample having the M.P. 76.4–77.8° C. (corr.).

Anal.—Calcd. for C₁₃H₁₄I₃NO₄: C, 24.82; H, 2.24; I, 60.53. Found: C, 24.85; H, 2.31; I, 60.24.

Example 24

Ethyl 2-(3-acetamido-2,4,6-triiodobenzoyloxy)propanoate [C; R¹ is CH₃, R² is COCH₃, R³ is H, R⁴ is C₂H₅] was prepared from 40 g. of 3-acetamido-2,4,6-triiodobenzoic acid, 15 g. of ethyl α-bromopropionate and 3.9 g. of sodium carbonate in 150 ml. of dimethylformamide according to the manipulative procedure described above in Example 17. The product was recrystallized twice from 200 ml. of isopropyl alcohol and then from a mixture of 300 ml. of benzene and 100 ml. of n-hexane, and dried for seventy-two hours at 100° C. to give 26 g. of ethyl 2-(3-acetamido-2,4,6-triiodobenzoyloxy)propanoate, M.P. 169.6–171.2° C. (corr.).

Anal.—Calcd. for C₁₄H₁₄I₃NO₅: C, 25.60; H, 2.15; I, 57.95. Found: C, 25.38; H, 1.85; I, 57.92.

Alternatively, ethyl 2-(3-acetamido - 2,4,6 - triiodobenzoyloxy)propanoate can be prepared from ethyl 2-(3-amino-2,4,6-triiodobenzoyloxy)propionate and acetic anhydride in the presence of a trace of sulfuric acid according to the manipulative procedure described below in Example 41.

Ethyl 2-(3-acetamido-2,4,6-triiodobenzoyloxy)propanoate was found to have an intraperitoneal toxicity in mice ($ALD_{50}$) of greater than 8000 mg./kg., and was absorbed from the peritoneal cavity within seven days, thus indicating its usefulness as a hepatolienographic agent.

Example 25

*3,5-diacetamido-2,4,6-triiodobenzoyloxyacetic acid* [A; $R^1$ is H, $R^2$ is $COCH_3$, $R^3$ is $CH_3CONH$].—Ethyl (3,5-diacetamido-2,4,6-triiodobenzoyloxy)acetate (47 g., 0.067 mole) (Example 1) was suspended in 250 ml. of water, 30 ml. of 2 N sodium hydroxide solution was added, and the mixture was heated with stirring on a steam bath. Methanol was added from time to time to cause partial solution of the solid material. After the pH of the solution had dropped to near the neutral point, 10 ml. of additional 2 N sodium hydroxide solution was added and heating was continued. After a total heating time of about three hours, the reaction mixture was filtered, diluted with water and the filtrate was made acid with 6 N hydrochloric acid. The solid product was collected, washed with water and acetone and dried at 100° C. to give 41 g. of 3,5-diacetamido - 2,4,6, - triiodobenzoyloxyacetic acid. The latter material was dissolved in 55 ml. of dimethylformamide. The solution was filtered, and the filtrate was diluted with 200 ml. of water. The purified material was collected by filtration and dried at 100° C. for three days, giving a sample of the compound with the M.P. 287.5° C. (indefinite) (corr.).

*Anal.*—Calcd. for $C_{13}H_{11}I_3N_2O_6$: I, 56.7; N, 4.16. Found: I, 56.8; N, 4.09. Neut. Equiv. Calcd.: 672. Found: 667.

Example 26

*3,5-diformylamino - 2,4,6 - triiodobenzoyloxyacetic acid* [A; $R^1$ is H, $R^2$ is COH, $R^3$ is HCONH] can be prepared by replacement of the ethyl (3,5-diacetamido-2,4,6-triiodobenzoyloxy)acetate in Example 25 by a molar equivalent amount of ethyl (3,5-diformylamino-2,4,6-triiodobenzoyloxy)acetate.

Example 27

*3,5-dipropionylamino-2,4,6-triiodobenzoyloxyacetic acid* [A; $R^1$ is H, $R^2$ is $COCH_2CH_3$, $R^3$ is $CH_3CH_2CONH$] can be prepared by replacement of the ethyl (3,5-diacetamido-2,4,6-triiodobenzoyloxy)acetate in Example 25 by a molar equivalent amount of ethyl (3,5-dipropionylamino-2,4,6-triiodobenzoyloxy)acetate.

Example 28

*3-acetylamino-5-propionylamino - 2,4,6 - triiodobenzoyloxyacetic acid* [A; $R^1$ is H, $R^2$ is $COCH_3$, $R^3$ is $CH_3CH_2CONH$] can be prepared by replacement of the ethyl (3,5-diacetamido-2,4,6-triiodobenzoyloxy)acetate in Example 25 by a molar equivalent amount of ethyl (3-acetylamino-5-propionylamino - 2,4,6 - triiodobenzoyloxy)acetate.

Example 29

*3,5-dibutyrylamino - 2,4,6-triiodobenzoyloxyacetic acid* [A; $R^1$ is H, $R^2$ is $CO(CH_2)_2CH_3$, $R^3$ is $CH_3(CH_2)_2CONH$] can be prepared by replacement of the ethyl (3,5-diacetamido-2,4,6-triiodobenzoyloxy)acetate in Example 25 by a molar equivalent amount of ethyl (3,5-dibutyrylamino-2,4,6-triiodobenzoyloxy)acetate.

Example 30

*3-acetylamino-5-caproylamino - 2,4,6 - triiodobenzoyloxyacetic acid* [A; $R^1$ is H, $R^2$ is $COCH_3$, $R^3$ is $(CH_3(CH_2)_4CONH$] can be prepared by replacement of the ethyl (3,5-diacetamido-2,4,6-triiodobenzoyloxy)acetate in Example 25 by a molar equivalent amount of ethyl (3-acetylamino - 5 - caproylamino - 2,4,6 - triiodobenzoyloxy)acetate.

Example 31

*3-propionylamino - 2,4,6 - triiodobenzoyloxyacetic acid* [A; $R^1$ is H, $R^2$ is $COCH_2CH_3$, $R^3$ is H] can be prepared by replacement of the ethyl (3,5-diacetamido-2,4,6-triiodobenzoyloxy)acetate in Example 25 by a molar equivalent amount of ethyl (3-propionylamino-2,4,6-triiodobenzoyloxy)acetate.

Example 32

*3-butyrylamino-2,4,6-triiodobenzoyloxyacetic acid* [A; $R^1$ is H, $R^2$ is $CO(CH_2)_2CH_3$, $R^3$ is H] can be prepared by replacement of the ethyl (3,5-diacetamido-2,4,6-triiodobenzoyloxy)acetate in Example 25 by a molar equivalent amount of ethyl (3-butyrylamino-2,4,6-triiodobenzoyloxy)acetate.

Example 33

*3,5-diacetamido-2,4,6-triiodobenzoyloxypentanoic acid* [A; $R^1$ is $CH_3(CH_2)_2$, $R^2$ is $COCH_3$, $R^3$ is $CH_3CONH$] can be prepared by replacement of the ethyl (3,5-diacetamido-2,4,6-triiodobenzoyloxy)-acetate in Example 25 by a molar equivalent amount of ethyl 2-(3,5-diacetamido-2,4,6-triiodobenzoyloxy)pentanoate.

Example 34

*3,5-diacetamido-2,4,6-triiodobenzoyloxyhexanoic acid* [A; $R^1$ is $CH_3(CH_2)_3$, $R^2$ is $COCH_3$, $R^3$ is $CH_3CONH$] can be prepared by replacement of the ethyl (3,5-diacetamido-2,4,6-triiodobenzoyloxy)acetate in Example 25 by a molar equivalent amount of ethyl 2-(3,5-diacetamido-2,4,6-triiodobenzoyloxy)hexanoate.

Example 35

*3,5-diacetamido-2,4,6-triiodobenzoyloxy - 3 - methylbutanoic acid* [A; $R^1$ is $(CH_3)_2CH$, $R^2$ is $COCH_3$, $R^3$ is $CH_3CONH$] can be prepared by replacement of the ethyl (3,5-diacetamido-2,4,6-triiodobenzoyloxy)acetate in Example 25 by a molar equivalent amount of ethyl 2-(3,5-diacetamido-2,4,6-triiodobenzoyloxy)-3-methylbutanoate.

Example 36

*2-(3,5-diacetamido - 2,4,6 - triiodobenzoyloxy)butanoic acid* [A; $R^1$ is $C_2H_5$, $R^2$ is $COCH_3$, $R^3$ is $CH_3CONH$] was prepared from 25.4 g. of ethyl 2-(3,5-diacetamido-2,4,6-triiodobenzoyloxy)butanoate and 23 ml. of 1.83 N sodium hydroxide solution in aqueous methanol according to the manipulative procedure described above in Example 25 except that the reaction mixture was heated for about thirty hours. There was thus obtained 2-(3,5-diacetamido-2,4,6-triiodobenzoyloxy)butanoic acid, M.P. 284° C. (dec.) (corr.) when recrystallized from methanol.

*Analysis.*—Calcd. for $C_{15}H_{15}I_3N_2O_6$: N, 4.00; I, 54.4. Found: N, 3.91; I, 54.8. Neut. Equiv. Calcd.: 700. Found: 698.

2 - (3,5-diacetamido-2,4,6-triiodobenzoyloxy)butanoic acid was found to have an intravenous toxicity ($LD_{50}$) in the mouse of 5700±300 mg./kg., and produced excellent shadows of the gallbladder in X-ray pictures when administered intravenously to cats in a dose of 100 mg./kg.

Example 37

Sodium 2-(3,5-diacetamido - 2,4,6 - triiodobenzoyloxy)butanoate is prepared by reacting 2-(3,5-diacetamido-2,4,6-triiodobenzoyloxy)butanoic acid with a molar equivalent amount of aqueous sodium hydroxide solution. A clear solution of the sodium salt results, and said salt can be obtained in solid form by concentration of the solution in vacuo.

By replacement of the sodium hydroxide in the preceding preparation by a molar equivalent amount of potassium hydroxide, calcium hydroxide, ammonium hydroxide, diethanolamine or N-methylglucamine, there can be obtained, respectively, the potassium, calcium, ammonium, diethanolammonium or N-methylglucammonium salts of 2-(3,5-diacetamido-2,4,6-triiodobenzoyloxy)butanoic acid.

Example 38

*3-acetamido-2,4,6-triiodobenzoyloxyacetic acid* [A; $R^1$ is H, $R^2$ is $COCH_3$, $R^3$ is H] was prepared from 19 g. of ethyl (3-acetamido-2,4,6-triiodobenzoyloxy)acetate and 15.5 ml. of 1.82 N sodium hydroxide solution in aqueous methanol according to the manipulative procedure described above in Example 25. There was thus obtained 14 g. of 3-acetamido-2,4,6-triiodobenzoyloxyacetic acid, M.P. 212.6–214.6° C. (corr.) when recrystallized from aqueous ethanol.

*Anal.*—Calcd. for $C_{11}H_8I_3NO_5$: I, 61.91. Found: I, 62.10. Neut. Equiv. Calcd.: 615. Found: 620.

Example 39

*2-(3-amino-2,4,6-triiodobenzoyloxy)butanoic acid* [A; $R^1$ is $C_2H_5$, $R^2$ is H, $R^3$ is H] was prepared from 15.4 g. of ethyl 2-(3-amino-2,4,6-triiodobenzoyloxy)butanoate and 12.1 ml. of 2.07 N sodium hydroxide solution in aqueous ethanol according to the manipulative procedure described above in Example 25. The crude product was dissolved in 200 ml. of 5% sodium bicarbonate solution, the solution was filtered and the filtrate made acid with dilute hydrochloric acid. The product was collected by filtration, washed with water, dried, and recrystallized from acetic acid, again washed with water and dried at 100° C. in vacuo to give 8 g. of 2-(3-amino-2,4,6-triiodobenzoyloxy)butanoic acid, M.P. 124.2–129.4° C. (corr.).

*Anal.*—Calcd. for $C_{11}H_{10}I_3NO_4$: C, 21.95; H, 1.67; I, 63.4. Found: C, 21.92; H, 1.67; I, 63.2.

2-(3-amino-2,4,6-triiodobenzoyloxy)butanoic acid was found to have an intravenous toxicity ($ALD_{50}$) in the mouse of 565 mg./kg., and produced good shadows of the gallbladder in X-ray pictures when administered either intravenously or orally to cats in a dose of 100 mg./kg.

Example 40

*3-amino-2,4,6-triiodobenzoyloxyacetic acid* [A; $R^1$ is H, $R^2$ is H, $R^3$ is H] was prepared from 22 g. of ethyl (3-amino-2,4,6-triiodobenzoyloxy)acetate and 19 ml. of 1.93 N sodium hydroxide solution in aqueous ethanol according to the manipulative procedure described above in Example 25. The product was recrystallized from 800 ml. of isopropyl alcohol to give 14 g. of 3-amino-2,4,6-triiodobenzoyloxyacetic acid, M.P. 173.2–175.6° C. (corr.).

*Anal.*—Calcd. for $C_9H_6I_3NO_4$: I, 66.5. Found: I, 66.8. Neut. Equiv. Calcd.: 573. Found: 574.

3-amino-2,4,6-triiodobenzoyloxyacetic acid was found to have an intravenous toxicity ($ALD_{50}$) in the mouse of 375 mg./kg., and produced good shadows of the gallbladder in X-ray pictures when administered orally to cats in a dose of 100 mg./kg.

Example 41

*2-(3-acetamido - 2,4,6 - triiodobenzoyloxy)butanoic acid* [A; $R^1$ is $C_2H_5$, $R^2$ is $COCH_3$, $R^3$ is H].—A mixture of 30 g. of 2-(3-amino - 2,4,6 - triiodobenzoyloxy)butanoic acid, 50 ml. of acetic anhydride and two drops of concentrated sulfuric acid was heated on a steam bath for fifteen minutes. The excess acetic anhydride was destroyed by careful addition of warm water and the reaction mixture was diluted with water to a volume of 1 liter. The solid product was collected by filtration, washed with water and recrystallized from aqueous dimethylformamide. The resulting product was dissolved in dilute sodium hydroxide solution, the solution was filtered, and the filtrate was acidified with hydrochloric acid. The resulting precipitate was collected by filtration, washed with water and dried at 100° C. for twenty-hour hours to give 2-(3-acetamido-2,4,6-triiodobenzoyloxy)-butanoic acid, M.P. 125.4–135.0° C. (dec.) (corr.).

*Anal.*—Calcd. for $C_{13}H_{12}I_3NO_5$: C, 24.29; H, 1.88; I, 59.23. Found: C, 24.34; H, 1.51; I, 59.01.

2-(3-acetamido - 2,4,6 - triiodobenzoyloxy)butanoic acid was found to have an intravenous toxicity ($ALD_{50}$) in the mouse of 2500 mg./kg., and produced good shadows of the gallbladder in X-ray pictures when administered intravenously to cats in a dose of 100 mg./kg.

Example 42

*2-(3-amino - 2,4,6 - triiodobenzoyloxy)propanoic acid* [A; $R^1$ is $CH_3$, $R^2$ is H, $R^3$ is H] was prepared from 49 g. of ethyl 2-(3-amino - 2,4,6 - triiodobenzoyloxy)propanoate and 37.5 ml. of 2.14 N sodium hydroxide solution in aqueous ethanol according to the manipulative procedure described above in Example 25. The resulting product was recrystallized from 125 ml. of methanol and then from 125 ml. of isopropyl alcohol containing 30 ml. of 2.14 N sodium hydroxide solution from which there separated 2-(3-amino - 2,4,6 - triiodobenzoyloxy)propanoic acid in the form of the sodium salt monohydrate, M.P. about 160.4° C. (corr.).

*Anal.*—Calcd. for $C_{10}H_7I_3NNaO_4 \cdot H_2O$: C, 19.16; H, 1.45; I, 60.74; $H_2O$, 2.87. Found: C, 19.34; H, 1.65; I, 60.94; $H_2O$, 3.20.

Example 43

*2-(3-acetamido - 2,4,6 - triiodobenzoyloxy)propanoic acid* [A; $R^1$ is $CH_3$, $R^2$ is $COCH_3$, $R^3$ is H] was prepared from 49 g. of sodium 2-(3-amino - 2,4,6 - triiodobenzoyloxy)propanoate, 100 ml. of acetic anhydride and 1 ml. of sulfuric acid according to the manipulative procedure described above in Example 41. There was thus obtained 2-(3-acetamido - 2,4,6 - triiodobenzoyloxy)propanoic acid as a monohydrate, M.P. about 104° C. (corr.).

*Anal.*—Calcd. for $C_{12}H_{10}I_3NO_5 \cdot H_2O$: I, 58.86; $H_2O$, 2.78. Found: I, 58.94; $H_2O$, 2.38. Neut. Equiv. Calcd.: 647. Found 647.

Example 44

*2-(3,5-diacetamido - 2,4,6 - triiodobenzoyloxy)propanoic acid* [A; $R^1$ is $CH_3$, $R^2$ is $COCH_3$, $R^3$ is $CH_3CONH$] was prepared from 25.7 g. of ethyl 2-(3,5'-diacetamido-2,4,6-triiodobenzoyloxy)propanoate and 14.75 ml. of 2.025 N sodium hydroxide solution in aqueous ethanol according to the manipulative procedure described above in Example 25. There was thus obtained 2-(3,5-diacetamido - 2,4,6 - triiodobenzoyloxy)propanoic acid, M.P. about 300° C. (corr.) when recrystallized from aqueous dimethylformamide.

*Anal.*—Calcd. for $C_{14}H_{13}I_3N_2O_6$: I, 55.51. Found: I, 55.33. Neut. Equiv. Calcd.: 686. Found: 680.

I claim:

1. A compound having the formula

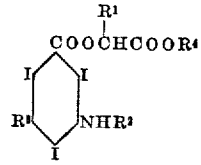

wherein $R^1$ represents a member of the group consisting of hydrogen and lower-alkyl, $R^4$ represents lower-alkyl, $R^2$ represents a member of the group consisting of hydrogen and lower-alkanoyl, and $R^3$ represents a member of the group consisting of hydrogen and lower-alkanoylamino.

2. A member of the group consisting of (A) compounds having the formula

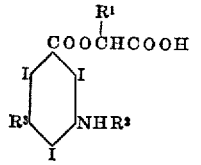

wherein $R^1$ represents a member of the group consisting

3. Ethyl (3,5-diacetamido - 2,4,6 - triiodobenzoyloxy)-acetate.
4. Ethyl 2-(3,5-diacetamido - 2,4,6 - triiodobenzoyloxy)-butanoate.
5. Ethyl (3-acetamido - 2,4,6 - triiodobenzoyloxy)-acetate.
6. Ethyl 2-(3-acetamido - 2,4,6 - triiodobenzoyloxy)-butanoate.
7. Ethyl 2-(3,5-diacetamido - 2,4,6 - triiodobenzoyloxy)propanoate.
8. Ethyl 2-(3-acetamido - 2,4,6 - triiodobenzoyloxy)-propanoate.
9. Ethyl (3-amino - 2,4,6 - triiodobenzoyloxy)acetate.
10. Ethyl 2-(3-amino - 2,4,6 - triiodobenzoyloxy)-propanoate.
11. Ethyl 2 - (3 - amino - 2,4,6 - triiodobenzoyloxy)-butanoate.
12. 3,5-diacetamido - 2,4,6 - triiodobenzoyloxyacetic acid.
13. 2 - (3,5 - diacetamido - 2,4,6 - triiodobenzoyloxy)-butanoic acid.
14. 3-acetamido-2,4,6-triiodobenzoyloxyacetic acid.
15. 2-(acetamido - 2,4,6 - triiodobenzoyloxy)butanoic acid.
16. 2-(3-acetamido - 2,4,6 - triiodobenzoyloxy)propanoic acid.
17. 2-(3,5-diacetamido - 2,4,6 - triiodobenzoyloxy)-propanoic acid.
18. 2-(3 - amino - 2,4,6 - triiodobenzoyloxy)butanoic acid.
19. 3-amino-2,4,6-triiodobenzoyloxyacetic acid.
20. 2-(3-amino - 2,4,6 - triiodobenzoyloxy)propionic acid.

21. The process for preparing a compound having the formula

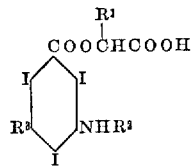

wherein $R^1$ represents a member of the group consisting of hydrogen and lower-alkyl, $R^2$ represents a member of the group consisting of hydrogen and lower-alkanoyl, and $R^3$ represents a member of the group consisting of hydrogen and lower-alkanoylamino, which comprises heating a lower-alkyl ester of said compound with approximately one molar equivalent of an alkali metal hydroxide in aqueous-lower-alkanol solution.

22. The process for preparing 2-(3,5-diacetamido-2,4,6-triiodobenzoyloxy)butanoic acid which comprises heating a lower-alkyl ester of 2-(3,5-diacetamido-2,4,6-triiodobenzoyloxy)butanoic acid with approximately one molar equivalent of an alkali metal hydroxide in aqueous-lower-alkanol solution.

References Cited in the file of this patent

UNITED STATES PATENTS

| | | |
|---|---|---|
| 2,260,628 | Kyrides | Oct. 28, 1941 |
| 2,642,435 | Clinton et al. | June 16, 1953 |
| 2,657,210 | Clinton | Oct. 27, 1953 |

FOREIGN PATENTS

| | | |
|---|---|---|
| 779,500 | Great Britain | July 24, 1957 |

OTHER REFERENCES

Beilstein, 9, 167 (1926).
Larsen et al.: J. Am. Chem. Soc., 78, 3210 to 3213 (1956).

UNITED STATES PATENT OFFICE
CERTIFICATE OF CORRECTION

Patent No. 3,097,228                              July 9, 1963

Aubrey A. Larsen

It is hereby certified that error appears in the above numbered patent requiring correction and that the said Letters Patent should read as corrected below.

Column 1, lines 38 and 39, strike out "The lower-alkanoylamino radical."; column 3, line 28, for "$CH_3CONHR$" read -- $CH_3CONH$ --; column 10, line 46, for "about" read -- above --; column 11, line 27, for "2-(acetamido-" read -- 2-(3-acetamido- --.

Signed and sealed this 21st day of January 1964.

(SEAL)
Attest:
ERNEST W. SWIDER                              EDWIN L. REYNOLDS

Attesting Officer                                Acting Commissioner of Patents